United States Patent [19]

Kondo

[11] 4,171,885

[45] Oct. 23, 1979

[54] AUTOMATIC FOCUSSING APPARATUS

[75] Inventor: Hideyuki Kondo, Suwa, Japan

[73] Assignee: Sankyo Kogaku Kogyo Kabushiki Kaisha, Japan

[21] Appl. No.: 886,354

[22] Filed: Mar. 14, 1978

[30] Foreign Application Priority Data

Jun. 2, 1977 [JP] Japan ............................ 52-70718[U]

[51] Int. Cl.² ............................ G03B 3/10; G03B 7/08
[52] U.S. Cl. ............................ 354/25; 352/140; 354/31; 354/60 L
[58] Field of Search .................... 354/25, 31, 60 L; 352/140; 355/56

[56] References Cited

U.S. PATENT DOCUMENTS

| | | | |
|---|---|---|---|
| 4,053,934 | 10/1977 | Kornreich et al. | 354/25 X |
| 4,091,275 | 5/1978 | Wilwerding | 352/140 X |

Primary Examiner—Michael L. Gellner
Attorney, Agent, or Firm—McGlew and Tuttle

[57] ABSTRACT

An automatic focussing apparatus is provided with a contrast sensor which senses the contrast of reflective light from an object being photographed and produces a signal indicative of the incapability of a focussing operation whenever the sensed result represents a low contrast.

5 Claims, 6 Drawing Figures

F I G. 3
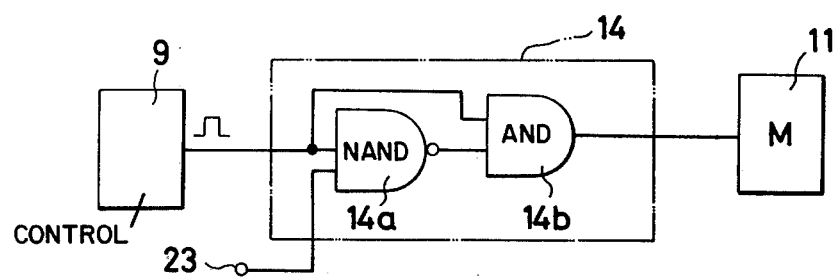
F I G. 4
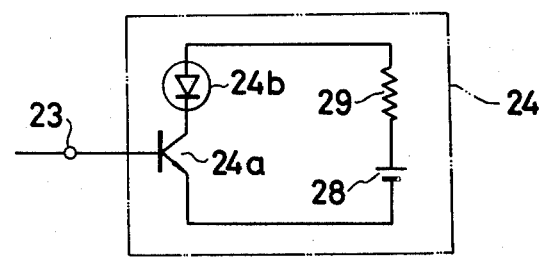

AUTOMATIC FOCUSSING APPARATUS

BACKGROUND OF THE INVENTION

The invention relates to an automatic focussing apparatus utilizing the principle of a range finder and which can find applications in a variety of cameras.

The present applicant has previously proposed a variety of automatic focussing apparatus which operates on the principle of a range finder. Specifically, reflective light rays from an object being photographed, which is made incident through a pair of independent windows, are led to a pair of light receiving elements through reflections by a stationary and a movable reflecting mirror. The coincidence of the amount of reflective light is detected and used as a reference for driving a focussing lens. One such apparatus is disclosed in U.S. Patent Application Ser. No. 856,038 filed Nov. 30, 1977 and assigned to the same common assignee as the present invention.

Since the apparatus operates to compare the respective amount of reflective light which are admitted through the pair of independent windows, the determination of the coincidence between both the incident inputs requires the presence of a difference therebetween of a given magnitude below which the detection is impossible. As a consequence, a contrast, of an object being photographed, which is above a preselected threshold is required for the effective operation of such apparatus.

More specifically, when a cine camera incorporating the automatic focussing apparatus disclosed in the above-mentioned patent application is used to take pictures of two men standing in front of a white wall by a panning process, the automatic focussing operation is achieved if either man appears within the field of sight of the camera or the apparatus. However, when only the white wall appears within the sight in the course of moving from one man to the other during the panning process, the focussing operation is disabled because of the loss of contrast in the object being photographed. Consequently, the focussing lens may be moved in an erroneous manner to result in an out-of-focus condition when either man appears again within the field of sight later, thus requiring a repeated focussing operation.

SUMMARY OF THE INVENTION

It is an object of the invention to produce a warning signal indicating the incapability of a focussing operation whenever the contrast of an object being photographed is low.

It is another object of the invention to produce a warning signal indicative of the incapability of a focussing operation by light emission from a light emitting element.

It is a further object of the invention to stop the movement of a focussing lens in response to a warning signal indicative of the incapability of a focussing operation.

It is still another object of the invention to provide a slow movement of a focussing lens toward infinity in response to a warning signal indicative of the incapability of a focussing operation.

A feature of the invention is the provision of a contrast sensor which senses the contrast of reflective light from an object being photographed and produces a signal whenever the sensed contrast is low. Further features of the invention include the provision of means for causing a light emission from a light emitting element, for stopping the movement of the focussing lens or for causing a slow movement of the focussing lens toward infinity, in response to a signal from the contrast sensor.

With the automatic focussing apparatus of the invention which incorporates these features, the incapability of an automatic focussing operation can be indicated in advance by the light emission from a light emitting element whenever the contrast of an object being photographed is low. The movement of the focussing lens can be stopped, preventing a further deviation of the focus as during a panning process. The addition of means for causing a slow movement of the focussing lens toward inifity in response to a warning signal also prevents a large deviation of the focus since the depth of focus toward the field of sight is changed in the increasing direction.

BRIEF DESCRIPTION OF THE DRAWINGS

FIG. 3 is a block diagram of focussing lens stop means which may be used in the embodiment of FIGS. 1 and 2.

FIG. 4 is a circuit diagram of light emitting means which may be used in the embodiment of FIG. 1.

DESCRIPTION OF THE PREFERRED EMBODIMENTS

Figure 1:
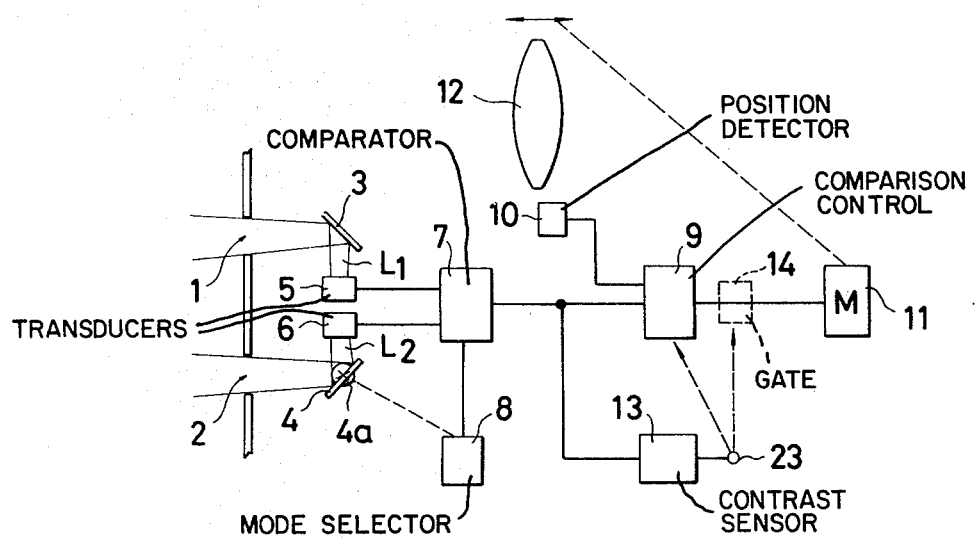
FIG. 1 is a block diagram of one embodiment of the invention.

Referring to FIG. 1, there is shown a pair of windows 1, 2 which are spaced apart by a given distance. The purpose of these windows is to allow the admittance of reflective light from an object being photographed onto a pair of associated reflecting mirrors 3, 4. The mirror 3 is stationary while the mirror 4 is movable by being mounted on a shaft 4a which is oscillated within a given angular extent. It is to be noted that the mirror 4 is located such that its reflecting surface lies in a plane which includes the axis of the shaft 4a. Both of these mirrors reflect incident light in a direction at right angles thereto. A photoelectric transducer element 5 is disposed on the path of light $L_1$ which is reflected by the stationary mirror 3 while another photoelectric transducer element 6 is disposed on the path of light $L_2$ which is reflected by the movable mirror 4. The outputs of the transducer elements 5, 6 are fed to a comparator 7, which produces a signal when a coincidence is reached between their outputs. In addition, the comparator 7 is connected with a mode selector 8 which detects whether the movable mirror 4 is moving in its forward or rearward mode and enables the operation of the comparator 7 only during a selected mode, for example, forward mode. It will thus be understood that the comparator 7 will produce a signal at a timing which depends on the distance to an object being photographed. The output signal of the comparator 7 is applied to a comparison controller 9, which also receives an output from a lens position detector 10 associated with a focussing lens, schematically shown at 12. The lens position detector 10 comprises a switch including a member which is oscillated in synchronism with the movable mirror 4 and which bears against a retaining ring for the focussing lens 12 to open or close the switch during its oscillation. The arrangement is such that the timing at which the switch is opened or closed depends on the position of the focussing lens 12. The comparison controller 9 compares the relative timing of the signals from the comparator 7 and from the lens position detector 10 during a selected mode, or during the forward mode in the present example, and produces an output signal indicative of the relative timing, but produces no output when both signals occur in time coincidence. The output signal of the comparison controller 9 is applied to a motor control circuit 11 which responds to the polarity of the output signal from the controller 9 to cause a motor to rotate in either forward or reverse direction, thus advancing or retracting the focussing lens 12.

The arrangement described thus far is similar to that disclosed in the mentioned U.S. Patent Application Ser. No. 856,038.

In accordance with the present invention, the output of the comparator 7 is also applied to a contrast sensor 13, which is responsive to the signal level from the comparator 7 to sense the contrast of an object being photographed and to produce a signal whenever the contrast of the object is below a threshold required for performing the automatic focussing operation. For its sensing of the contrast of the object, the contrast sensor 13 depends on the fact that the level of an output signal from the comparator 7 is related to a difference between the outputs of the pair of photoelectric transducer elements, which is in turn dependent on the contrast of the object. The sensor 13 has an output terminal 23 which is connected with the comparison controller 9 as shown by a phantom line so that an output signal thereof disables the controller 9. Alternatively, a gate 14, shown by a broken line block, may be interposed between the controller 9 and the motor drive circuit 11 and disabled by an output signal from the contrast sensor 13.

In this manner, the contrast sensor 13 senses the contrast of an object being photographed based upon the level of an output signal from the comparator 7, and produces a signal to disable the comparison controller 9 or gate 14 whenever the contrast is below a threshold required for the automatic focussing operation. When the sensor 13 produces an output signal, the motor activated circuit 11 cannot be driven, and hence the motor which drives the focussing lens cannot be energized, thus maintaining the focussing lens at a position which it last assumed and preventing an unstable condition of the focussing lens.

Figure 2:
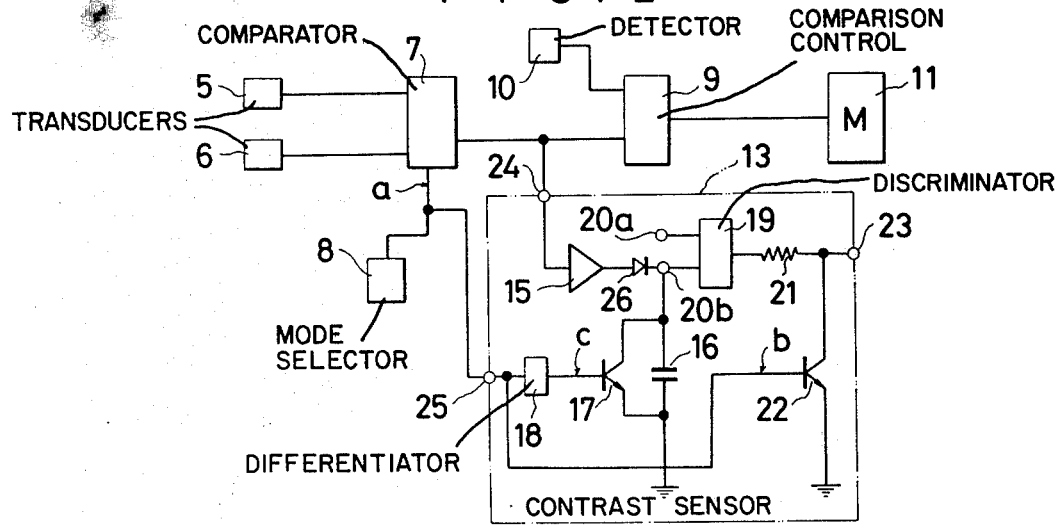
FIG. 2 is a more detailed block diagram of part of the embodiment shown in FIG. 1.

FIG. 2 shows a specific circuit arrangement of the contrast sensor 13. In this Figure, the sensor 13 includes a first input terminal 24 connected with the output terminal of the comparator 7 and which is connected with one input 20b of a level discriminator 19 through a series combination of an amplifier 15 and a diode 26. The other input 20a of the discriminator 19 is connected to a source of reference voltage. The output terminal of the discriminator 19 is connected with the output terminal 23 of the contrast sensor 13 through a resistor 21. It will be seen that the input terminal 20b is connected with the ground through a parallel combination of a capacitor 16 and a transistor 17. The output terminal 23 is also connected with the ground through another transistor 22. The sensor 13 also includes a second input terminal 25 connected with the output terminal of the mode selector 8 and which is connected with the base of the transistor 17 through a differentiator 18 and also connected with the base of the transistor 22 directly. The level discriminator 19 operates to compare the voltage input to the terminal 20b or the terminal voltage across the capacitor 16 against the reference voltage applied to the terminal 20a. It produces a high level signal when the terminal voltage is lower than the reference voltage, and produces a low level signal when the terminal voltage is higher than the reference voltage.

Figure 6:
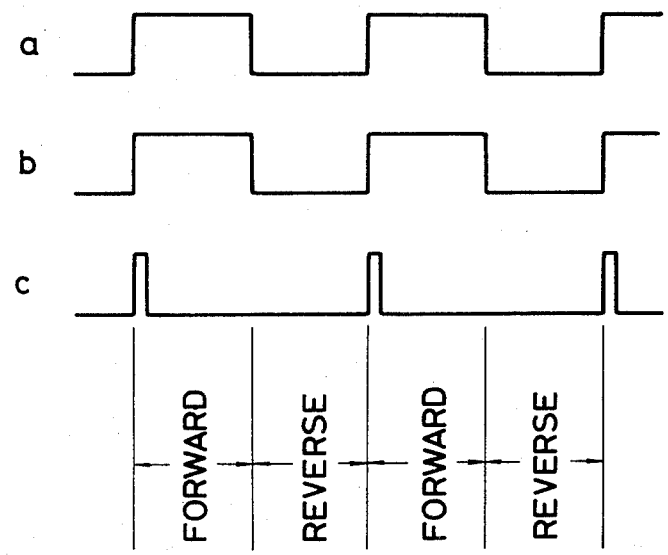
FIG. 6 is a timing chart illustrating the operation of the embodiment.

The operation of the contrast sensor 13 will now be described with reference to FIGS. 2 and 6. When the movable mirror 4 oscillates, the mode detector 8 detects in which of the forward and reverse mode the movable mirror 4 is then operating, and produces a high level and a low level signal during the forward mode and the reverse mode, respectively, as shown in FIG. 6a. Since the output signal of the mode detector 8 is directly applied to the base of the transistor 22, its output or the collector potential shifts between the high and low levels in synchronism with the output of the mode detector 8, as shown in FIG. 6b. Since the output signal of the mode detector 8 is also fed through the differentiator 18 to the base of the transistor 17, the transistor 17 is turned on by a rising edge of the signal from the mode detector 8 and is turned off after a time delay of relatively short length which is determined by the time constant of the differentiator 18. The output signal of the comparator 7 is amplified by the amplifier 15 and then fed through diode 26 to capacitor 16, thus charging it. However, as will be noted from FIG. 6, capacitor 16 will be once discharged at the commencement of the movement of the movable mirror 4 in the forward direction when transistor 17 is turned on. Thereafter, the output signal of the comparator 7 begins to charge the capacitor 16. The capacitor 16 will be charged to a terminal voltage which depends on the peak value of the output signal from the comparator 7 during the forward movement of the mirror 4.

When the contrast of an object being photographed is sufficiently high to cause the comparator 7 to produce an output of a high level to result in a terminal voltage across the capacitor 16 which is higher than the reference voltage applied to the input terminal 20a of the discriminator 19, a low level output will be produced from the discriminator 19 and at the output terminal 23 of the contrast sensor 13. On the other hand, when the contrast of the object is too low to permit an automatic focussing operation, the terminal voltage across the capacitor 16 will be below the reference voltage applied to the terminal 20a, so that the discriminator 19 produces a high level output. The high level output appears at the output terminal 23 of the contrast sensor 13 only when the transistor 22 is off or during the reverse mode of the movable mirror 4 since the transistor 22 is turned on to connect the output terminal 23 with the ground during the forward mode of the movable mirror 4. The high level signal produced at the terminal 23 represents a signal indicative of the incapability of a focussing operation, which is applied to the comparison controller 9 or the gate 14 mentioned above to interrupt the operation of the lens drive motor. The signal indicative of the incapability of a focussing operation, which is produced when the contrast of an object being photographed is low, intermittently appears only during the reverse mode, and is interrupted during the forward mode, of the mirror 4.

FIG. 3 shows a specific arrangement of the gate 14, which comprises a NAND circuit 14a and an AND circuit 14b, as shown. The output of the comparison controller 9 is connected with one input each of the circuits 14a and 14b, and the other input of the NAND circuit 14a is connected with the output terminal 23 of the contrast sensor 13. The output of the NAND circuit 14a feeds the other input of the AND circuit 14b, the output of which is connected with the motor drive circuit 11.

Assuming that the signal indicative of the incapability of a focussing operation is present at the output terminal 23, it assumes a high level during the reverse mode of the mirror 4 and is interrupted during the forward mode. By contrast, the signal from the comparison controller 9 is produced only during the forward mode of the mirror 4 in the present example, and thus the NAND circuit 14a produces a high output level only during the time a signal input from the comparison controller 9 is present, but assumes a low level during the remainder. Because the high level signal from the comparison controller 9 occurs in time coincidence with the low level signal from the NAND circuit 14a, it follows that the signal from the comparison controller 9 is blocked by the AND circuit 14b, thus interrupting the operation of the motor drive circuit 11 and maintaining the focussing lens in its last position.

In the absence of the signal indicative of the incapability of a focussing operation which is applied to one input of the NAND circuit 14a, it always produces a high level output to allow the signal from the comparison controller 9 to be gated through the AND circuit 14b to activate the motor drive circuit 11, thus achieving an intended automatic focussing operation.

Figure 5:
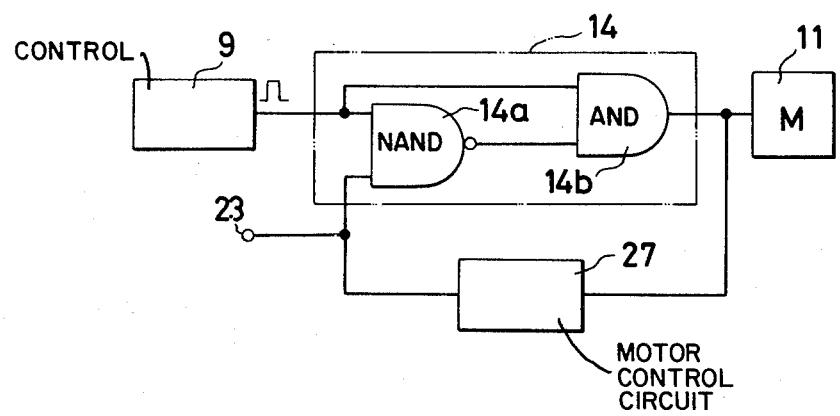
FIG. 5 is a block diagram of motor control means which can be used in the embodiment of FIG. 1.

FIG. 5 shows a modification in which a motor control circuit 27 is connected between the output terminal 23 and the input terminal of the motor drive circuit 11 for producing a signal which locates the focussing lens at a position corresponding to infinity in response to the signal appearing at the output terminal 23. With this arrangement, when the signal indicative of the incapability of a focussing operation appears at the output terminal 23, the signal from the comparison controller 9 is blocked by the AND circuit 14b as mentioned above while the motor control circuit 27 applies a signal to the drive circuit 11 which locates the focussing lens at a position corresponding to infinity. Thus the motor drive circuit 11 operates to drive focussing lens to a position corresponding to the infinity. In the example shown, the motor control circuit 27 is arranged so that it produces a series of regularly spaced pulses to cause a slow movement of the focussing lens.

FIG. 4 shows a warning circuit which produces a warning signal in the form of light emission from a light emitting element indicating the incapability of a focussing operation in response to the signal appearing at the output terminal 23 of the contrast sensor 13. Specifically, the light emission circuit 24 comprises a light emitting element or light emitting diode 24b, transitor 24a, power source 28 and resistor 29, all connected in series, with the base of transistor 24a connected with the output terminal 23. When the signal indicative of the incapability of a focussing operation appears at the output terminal 23, it is applied to the base of transistor 24a to turn it on and off periodically, producing a flashing operation of the element 24b to indicate that effect. The element 24b may be disposed within the finder of a camera in order to permit a user to known the incapability of a focussing operation when he is viewing the finder.

What is claimed is:

1. In an automatic focusing apparatus including a focusing lens, a pair of light receiving elements, a stationary reflecting mirror and a movable reflecting mirror operable to direct light, reflected from an object being photographed and incident upon the mirrors through respective separated windows, to respective light receiving elements, and comparison means connected to the light-receiving elements and operable to compare the outputs of the light-receiving elements to control movement of the focusing lens to effect automatic focusing: the improvement comprising a contrast sensor connected to said comparison means and operable to sense the contrast of the light reflected from the object to produce an output signal whenever said contrast sensor senses a contrast below a threshold value.

2. An automatic focussing apparatus according to claim 1, further including means responsive to an output signal from the contrast sensor for causing a slow movement of the focusing lens in a direction toward infinity.

3. An automatic focussing apparatus according to claim 1, including means for receiving an output signal from the contrast sensor to stop movement of the focussing lens.

4. An automatic focusing apparatus, according to claim 1, including a light emitting element energized responsive to the output signal of said contrast sensor.

5. An automatic focussing apparatus according to claim 4 in which the light emitting element is disposed within the field of sight of a finder.

* * * * *